UNITED STATES PATENT OFFICE 2,388,910

ADHESIVES AND THEIR MANUFACTURE

Eric W. Eweson, New York, N. Y.

No Drawing. Application September 25, 1942,
Serial No. 459,650

9 Claims. (Cl. 106—124)

This invention relates to adhesives and their manufacture, and has for an object the provision of improvements in this art. This application is a continuation-in-part of my copending application, Serial Number 373,725, filed January 9, 1941.

I have discovered that yeast can be treated to form from it a high grade of adhesive, and that yeast from sulphite liquor (the waste product from sulphite pulp mills) can be produced cheaply enough to make such adhesive economically. Moreover, when the adhesive is derived from yeast propagated in sulphite liquor, it may carry with it as an extender certain other solid substances such as lignin, which have adhesive properties, although not as pronounced as those of yeast alone processed according to the present invention.

The adhesive is made by heating yeast to a temperature of 160° to 220° F., to break down the cell walls, to sterilize it and agglutinize or gelatinize it. Yeast has no adhesive properties in its natural condition as yeast, but it produces a high grade adhesive when gelatinized, as by heating according to the present process. For instance, common baker's yeast containing about 70% moisture is a compressed powdery substance; and when heated as aforesaid, even without the addition of further water, it quickly becomes a thick homogeneous liquid mass, similar in appearance and character to thick glue.

Waste yeasts or yeasts which are defective for normal fermentation or nutrition purposes are still generally suitable for making adhesives. Also over-aged, molded or dead yeasts, which cannot be marketed, may form a source of supply which is comparable in economy to yeast propagated in sulphite liquor.

The invention will be described in connection with yeast propagated in sulphite liquor. Yeast may be derived from sulphite liquor by the so-called Heijkenskjold process, exemplified in Patent No. 1,680,043, August 7, 1928.

The Heijkenskjold process is based on the fact that sulphite liquor contains certain amounts of sugar. In broad outline, the Heijkenskjold process comprises the following steps: (1) neutralization of the acid liquor with a suitable basic material such as ammonia and powdered limestone; (2) filtration of the neutralized sulphite liquor; (3) initiating the growth of "super-nourished" seed yeast in a favorable environment as, for example, in a sugar solution or molasses; (4) continued propagation of yeast in the sugar solution while adding sulphite liquor and other nutritive material, and actively aerating the wort to protect the yeast from the toxic effect of the non-sugar components in the sulphite liquor and to prevent the formation of alcohol; (5) separation of the yeast from the wort; (6) washing the separated yeast repeatedly so that the sulphite liquor solids will be removed from the yeast; (7) filter-compressing the washed yeast to the usual marketable condition of common baker's yeast (about 70% moisture).

According to the present invention, the yeast does not have to be washed to free it from the sulphite liquor solids. These solids, notably lignin, can be retained as they do not materially lower the quality of the adhesive which is made from the yeast.

The yeast in pure form from the Heijkenskjold or some other process, or the yeast from the Heijkenskjold process as modified above, either with a consistency similar to so-called compressed yeast containing 65% to 72% moisture or with a consistency, for instance, of the creamy mass as it comes from the yeast separator with 88% to 92% moisture, is heated to a temperature which is high enough to break down the cell walls, to sterilize the yeast and agglutinize or gelatinize it, such temperature being from 160° to 220° F. A higher temperature might char it and spoil it as an adhesive.

With respect to yeast obtained from sulphite liquor according to the Heijkenskjold process, the heating of the yeast may also be done previous to the separation, in which case the yeast will be heated when it is still suspended in the spent sulphite liquor wort. In this case the yeast adhesive will carry a considerable amount of lignin, and will thus not be of as high a quality as the adhesive produced predominantly from yeast, but will be of higher quality than the various known adhesives produced simply by utilization of sulphite liquor without conversion of the therein contained sugars into yeast.

The aforesaid heating processes for the agglutinization of the yeast is preferably combined with dehydration by known methods, so that the resulting adhesives will have any desired water content, from thin adhesive to a solid adhesive. The final consistency of adhesive may be adjusted if necessary by adding the proper amount of water, preferably under heated conditions, as the adhesive is not easily soluble in cold water.

When the yeast adhesive is dried so as to become solid, it is preferably ground finely before packaging so that it will take up water quickly in preparation for ultimate use.

While certain embodiments of the invention have been described to illustrate the principles of the invention, it is to be understood that the invention may have various embodiments within the limits of the prior art and the scope of the subjoined claims.

I claim as my invention:

1. The method of producing adhesive which comprises, producing yeast from sulphite waste liquor free from alcohol but in the presence of lignin, and heating the yeast so produced to a temperature of about 160° F. to 220° F. to sterilize, agglutinize and break down the cell walls of the yeast.

2. The method of producing adhesive which comprises, producing yeast from sulphite waste liquor free from alcohol but in the presence of lignin, heating the yeast so produced to a temperature of about 160° F. to 220° F. to sterilize, agglutinize and break down the cell walls of the yeast, and incorporating lignin with the agglutinized yeast.

3. The method of producing adhesive which comprises, producing yeast from sulphite waste liquor free from alcohol but in the presence of lignin, heating the yeast so produced to a temperature of about 160° F. to 220° F. to sterilize, agglutinize and break down the cell walls of the yeast, and incorporating all of the lignin content of the sulphite liquor wort with the agglutinized yeast.

4. The method of producing adhesive which comprises, heating yeast to a temperature of about 160° F. to 220° F. to sterilize and agglutinize it and break down its cell walls to form the adhesive.

5. The method of producing adhesive which comprises, heating yeast to a temperature of about 160° F. to 220° F. to sterilize and agglutinize it and break down its cell walls to form the adhesive and incorporating lignin with the agglutinized yeast.

6. The method of producing adhesive which comprises, heating yeast to a temperature of about 160° F. to 220° F. to sterilize and agglutinize it and break down its cell walls to form the adhesive, drying the agglutinized yeast, and grinding the same to a fine powder.

7. The method of producing adhesive which comprises, heating yeast to a temperature of about 160° F. to 220° F. to sterilize and agglutinize it and to break down its cell walls to form the adhesive, incorporating lignin with the agglutinized yeast, drying the adhesive so formed, and grinding the same to a fine powder.

8. As an article of manufacture, an adhesive composed of sterilized, agglutinized yeast characterized in the undiluted state as a thick homogeneous liquid mass like thick glue and free from the grainy non-sticky appearance and character of the yeast before the cell walls are broken down.

9. As an article of manufacture, an adhesive composed of sterilized, agglutinized yeast and lignin characterized in the undiluted state as a thick homogeneous liquid mass like thick glue and free from the grainy non-sticky appearance and character of the yeast before the cell walls are broken down.

ERIC W. EWESON.